Figure 1:
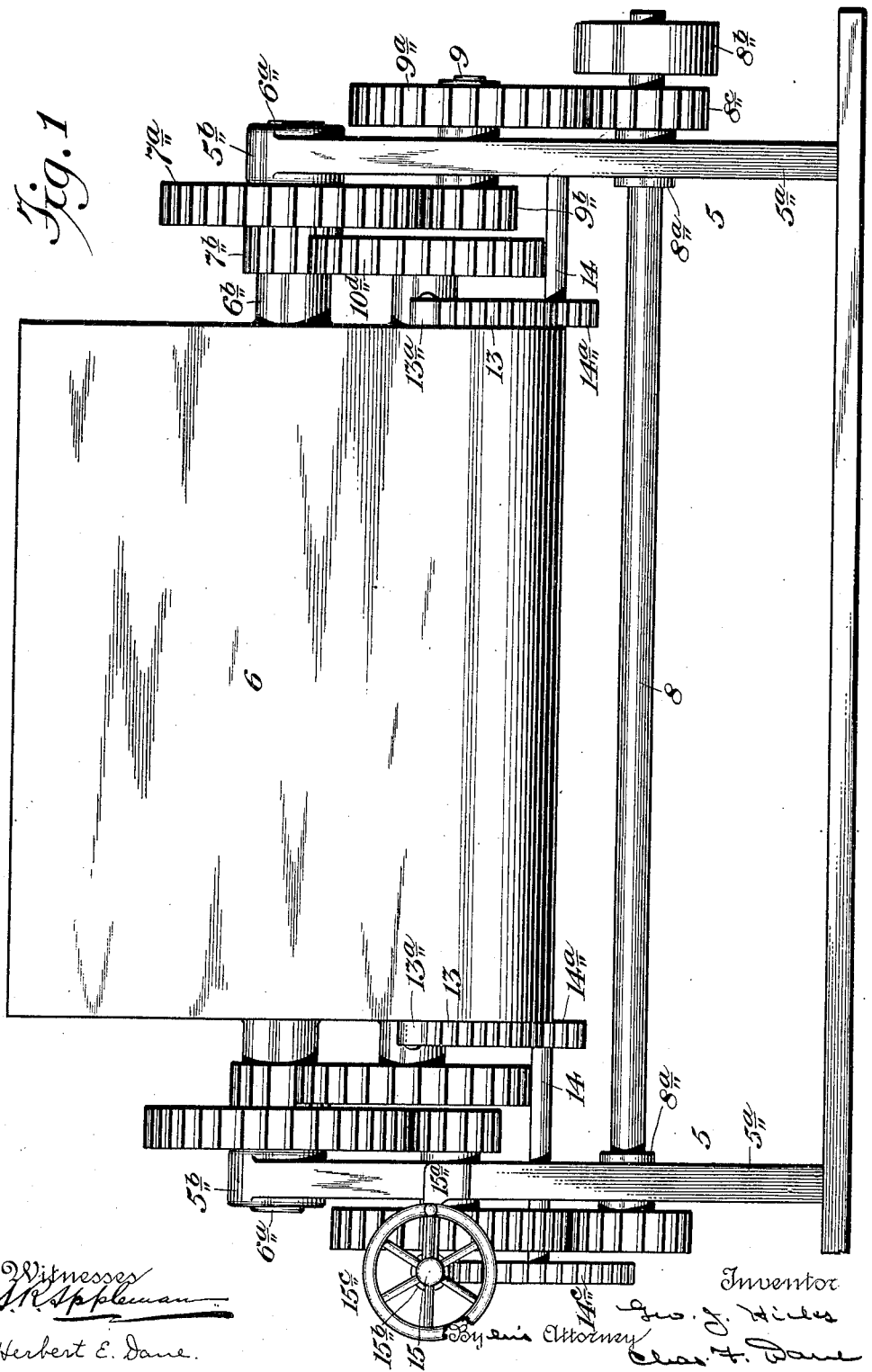

G. J. HICKS.
DOUGH MIXING AND KNEADING MACHINE.
APPLICATION FILED APR. 4, 1906.

913,133.

Patented Feb. 23, 1909
3 SHEETS—SHEET 2.

Witnesses
A. R. Appleman
Herbert E. Dane.

Inventor
Geo. J. Hicks
By his Attorney
Chas. H. Dane

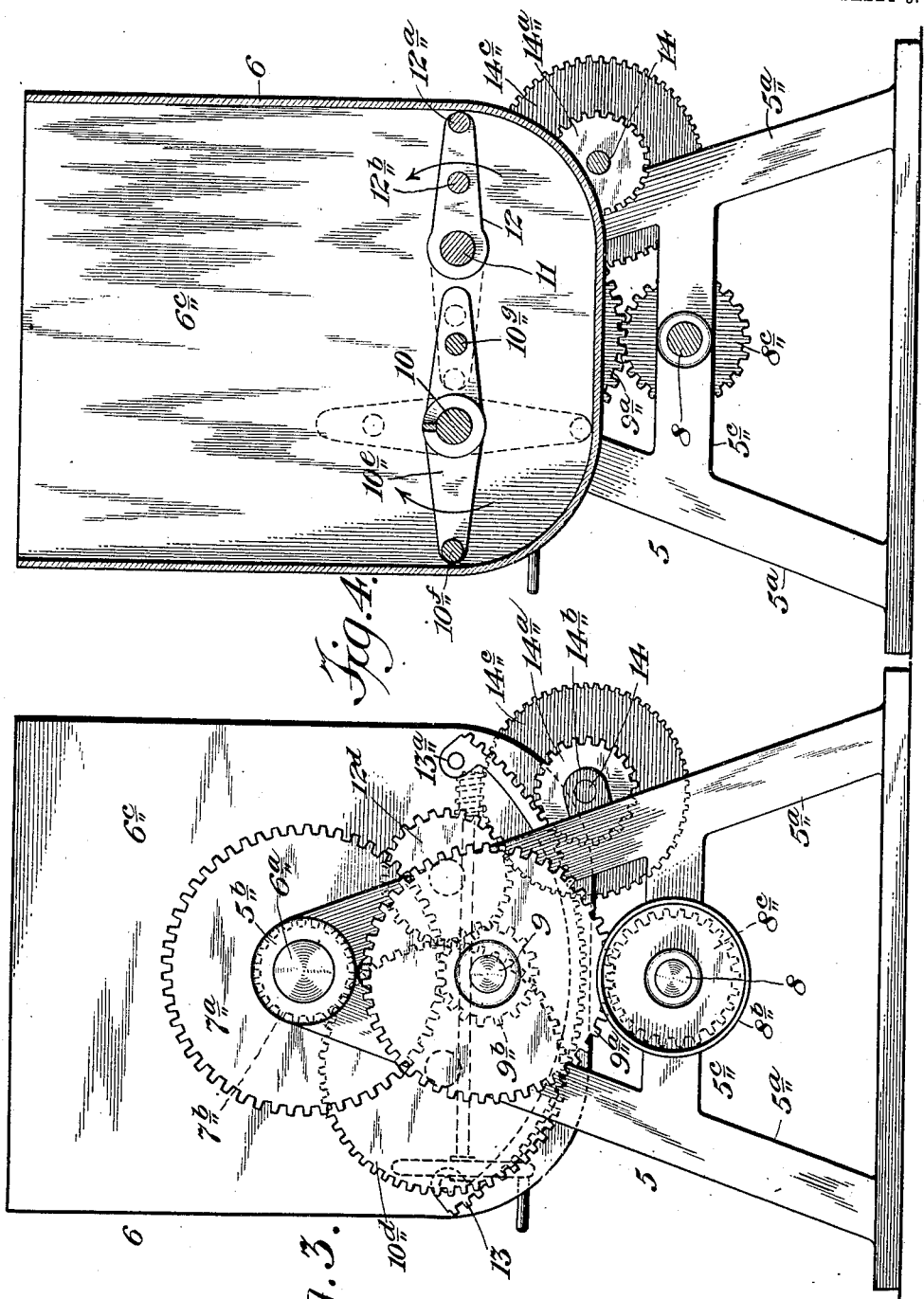

UNITED STATES PATENT OFFICE.

GEORGE J. HICKS, OF ARDSLEY, NEW YORK.

DOUGH MIXING AND KNEADING MACHINE.

No. 913,133.  Specification of Letters Patent.  Patented Feb. 23, 1909.

Application filed April 4, 1906. Serial No. 309,754.

*To all whom it may concern:*

Be it known that I, GEORGE J. HICKS, a citizen of the United States, and resident of Ardsley, in the county of Westchester and State of New York, have invented certain new and useful Improvements in Dough Mixing and Kneading Machines, of which the following is a specification.

The subject of this invention is a dough mixing and kneading machine of a type more particularly designed for use in bakeries and other establishments where it is desired that comparatively large batches be made.

Prominent considerations connected with the present novel machine are the thorough and rapid mixing and kneading of the dough, positiveness of operation and avoidance of strain on the actuating parts, and the improvement of the construction generally.

For conducting the mixing and kneading operation, two revoluble elements are employed which are adapted to be oppositely driven for causing the dough to assume two correspondingly revolved bodies surrounding and carried by the elements, the latter being so related with respect to each other and with the dough-tank as to alternately cross or overlap in their respective paths of movement and then pass in proximity to the tank, the effect being that the oppositely revolved bodies of dough will be overturned and subjected to a compressing action through impact one with the other, the succeeding downward movement of each element in a direction opposite to that of its companion, effecting a distention of the dough, while a subsequent movement will result in said element coöperating with the tank to further work the dough.

An embodiment of the invention provides for such peculiar intermeshing relation of the oppositely revoluble elements and in so driving the same at relatively different degrees of speed, that the compressing action due to the impact of one body of dough with the other, will occur at varying points in the respective paths of movement. Means may also be provided whereby the dough constituents, as well as the dough when such constituents are converted to such, are horizontally shifted simultaneously from opposite directions toward an intermediate point within the dough-tank, and then subjected to the compression and distention alluded to, the effect being that the entire mass undergoes the thorough treatment desired and the satisfactory final condition of the batch is assured.

One arrangement of mixing and kneading mechanism involves elements operable by gearing driven from a main shaft and so peculiarly actuative and mutually coöperative as to insure the dough-mass being uniformly mixed and kneaded.

For the purpose of nicely distributing the power imparted to the mixing and kneading elements, rendering the gear actuation more positive, and at the same time relieve said elements, gear parts and their coactive bearings of straining tendency, a second or duplicate system of gearing is employed which bears general relation to said rotating elements and is adapted to actuate the same, in a manner corresponding with that of the gearing first mentioned.

When the dough-tank is pivotally mounted, as it preferably will be, simple and conveniently operated devices are employed for accomplishing the easy tilting of said tank to dump the batch. The character of the tilting devices is such that while the tank will readily respond to any actuative movement of said devices, the latter will, when in a state of rest, maintain the tank normally vertical or in any position to which it may be tilted. The actuating gearing can be so conditioned, that the driving of the rotative elements may be continued during the tilting of the tank and thus expedite the discharge of the dough.

Figure 2:
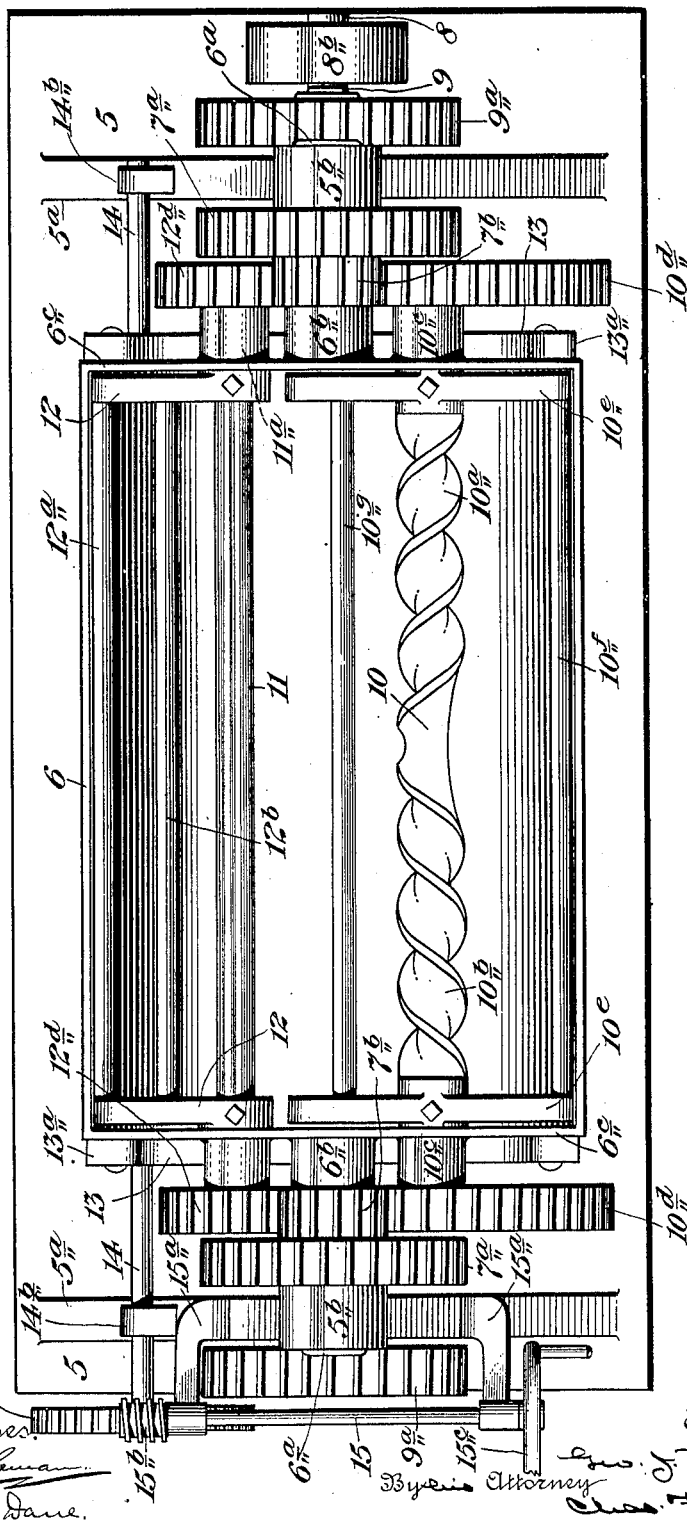

In the accompanying drawings forming part of this specification—Figure 1 is a side elevation of a mixing and kneading machine embodying my invention. Fig. 2 is a plan view of the machine. Fig. 3 is an end elevation of the machine viewed from a position at the right-hand of Fig. 1, and Fig. 4 is a central vertical transverse section of the machine.

Similar reference characters are employed to designate corresponding parts in the several figures where they occur.

While any suitable main support for the machine may be employed, that disclosed involves vertical end frames 5, 5, each of the form clearly illustrated in Fig. 3, and comprising a pair of upwardly converged standards 5ª, 5ª, merging at their upper ends in a bearing 5ᵇ, and intermediately connected by a horizontal brace 5ᶜ.

Oscillatively mounted in the bearings 5ᵇ, 5ᵇ, are the outer end portions of extended trunnions 6ª, 6ª, the inner extremities of which are firmly engaged within the tubular bosses 6ᵇ on the end walls 6ᶜ of the dough-tank 6 to properly support the latter. Revolubly mounted on one of the trunnions 6ª is a gear wheel 7ª and a pinion 7ᵇ rotatable together and confined between the contiguous tubular boss and adjacent bearing 5ᵇ, this arrangement serving to maintain both said gear wheels and the tank in proper longitudinal position.

Mounted in bearings 8ª in the braces 5ᶜ see Fig. 1 is the main driving shaft 8. An end portion of this shaft projects beyond the contiguous frame 5 and has secured thereon to revolve therewith a pulley 8ᵇ, to which power may be transmitted by suitable belt gearing, a comparatively small gear-wheel 8ᶜ being also secured to said projecting portion but more closely adjacent to the end frame.

In a third bearing in the frame 5, and which bearing is midway between the upper and lower bearings previously referred to is a stub-shaft 9, revoluble with which is an outer gear-wheel 9ª, and an inner pinion 9ᵇ, said wheel meshing with the wheel 8ᶜ, while the pinion 9ᵇ gears with the wheel 7ª on the trunnion above.

Within the lower part of the tank 6 are the mixing and kneading means, which in the form shown include a horizontal conveyer 10 embodying right and left hand spiral flights 10ª, 10ᵇ, extending from the direction of the tank-ends to an intermediate point of the conveyer length where they merge the one into the other. The somewhat elongated journals 10ᶜ, 10ᶜ, (dotted lines, Fig. 2) of the conveyer are revolubly supported in tubular bearings on the end walls 6ᶜ of the tank, and also project beyond said bearings for the connection of gear-wheels, as will be described. On one of such projecting journal portions of the conveyer is secured a large gear-wheel 10ᵈ, the teeth of which are engaged by those of the pinion 7ᵇ, for the purpose of transmitting a revolving motion to the conveyer. Rigidly bolted on each end of the conveyer and closely adjacent to the tank-ends, are cross heads 10ᵉ, presenting diametrically disposed arms, the arms at one side of the conveyer being longitudinally connected at their outer ends by a rod 10ᶠ, while a similar rod 10ᵍ connects the arms at the opposite side of but at points somewhat nearer the conveyer. Also within the lower part of the tank 6 but at the side of its longitudinal center opposite that at which the conveyer and its appurtenances are located, is a longitudinal shaft 11, the end portions 11ª (dotted lines, Fig. 2) of which extend through and project beyond tubular bosses on the tank-ends. Secured on the shaft 11 immediately adjacent to the inner surfaces of said ends, are arms 12, 12, which correspondingly extend to one side only of the shaft and are rigidly connected at their outer ends by a longitudinal rod 12ª, and at intermediate points by a similar rod 12ᵇ. Secured on the projecting journal-portion of the shaft 11 at the right-hand side of the machine is a small gear-wheel 12ᵈ which meshes in the larger wheel 10ᵈ appertaining to the conveyer 10 and its parts.

From the description thus far, it will readily be understood that with the desired amount of the dough constituents, including the proper quantity of water, within the tank, and upon motion in a certain direction being imparted to the main shaft 8, and transmitted through the intermediate train of gearing, the respectively large and small wheels 10ᵈ and 12ᵈ will, by reason of their inermeshing relation, be oppositely revolved in the directions indicated by the arrows in Fig. 4, the spiral conveyer and parts carried thereby on the one hand, and the arms 12, 12, with their connecting rods on the other hand, presenting two elements which are revolved in correspondingly opposite directions and at relatively different degrees of speed. Under such conditions, the compound conveyer operating in one part of the tank, will horizontally shift and transfer the material from the direction of the tank-ends to a more intermediate point, and will coincidently, by reason of its spiral character, operate to promote an admixture of the flour and water. The dough mass, while being thus acted upon by the conveyer 10, is also intermittently acted upon by the rapidly revolved rods 10ᶠ and 10ᵍ, which, by reason of their relative differences of position in their respective arms, acquire distinct paths of movement and therefore the more effectively move the material along the lower part of the tank, beneath and to a plane at the opposite side of the conveyer, where the succeeding rising movement of each rod tends, when the mass has assumed a certain consistency, to carry upwardly a considerable quantity of said mass. During the movement of the dough-mass from one side of the conveyer to the other side thereof as just stated, the rods also exert an overturning effect on the same, which manifestly conduces to the proper formation of the dough.

The gear-wheel 12ᵈ, being of smaller diameter than the gear-wheel 10ᵈ, operates to revolve the arms 12 at a much higher rate of speed than that at which the cross-heads 10ᵉ move, the ratio of revolution being two of the smaller wheel to one of the larger wheel. The revolution of the two mixing and kneading elements thus provided, results in the material practically assuming two longitudinally disposed bodies of dough carried and revolved by their respective elements. The relatively opposite motions, differential speeding and peculiar adjusted positions of such elements, establishes such intermeshing working relation of said elements that each alternately overlaps the path of movement of the other and thereby causes compression of the bodies of dough through impact one with the other.

The more rapid motion of one of the elements will tend to vary the point at which such compression occurs along the paths of the respective elements, and also the degree of such compression, and thus contributing to the thoroughness of the mixing and kneading operation. Thus, for instance, there will be periods when dough in the vicinity of the axis of the more rapidly driven element, will be subjected to impact by the other body of dough as the element influencing the latter moves to a horizontal position. At other periods, the impact will be sustained by dough in the vicinity of the axis of the slower moving element and also by dough at the extreme part of the faster driven element, the former element, under such conditions, approximately moving past its vertical position, while the other element is descending to its inner horizontal position. Irrespective, however, of the point where such compression occurs, the subsequent separating movement which the elements undergo, exerts a distending action on the dough. At those rapidly recurring periods when the impact has occurred during the descent of one of the elements from its inner horizontal position and the downward movement of the other element to its inner horizontal position, in addition to the distention previously referred to, the further descent of each element will carry it with its body of dough in proximity to and along the tank-bottom against which the dough is successively compressed and spread or stretched along the same. It will be recognized that the more rapidly driven rods $12^a$, $12^b$, do service at rapidly succeeding periods with both rods $10^f$, $10^g$. Furthermore, the relative variation in the position of the rod $10^g$ in its arms, with respect to the position of the rod $10^f$, and the difference in position of the rods $12^a$, $12^b$, insures that the latter in their inner downward movements will overlap or cross the paths traversed by said rods $10^f$, $10^g$, and thus continuously cause a back and forth transfer of considerable proportions of the dough across a longitudinal plane intermediately of the tank, and consequently ultimately bringing all portions of the mass into position for being directly acted upon by the combined stirrers and kneaders comprising the revolving rods.

Upon the termination of the mixing and kneading operation, the batch can be removed from the tank, which latter, by reason of its trunnion support, can be tilted to promote such removal. The tilting of the tank will not be interfered with by the gearing as the positively driven pinion $7^b$ is concentric with the pivotal axis of said tank, and it is this pinion-wheel which communicates motion to the wheel $10^d$, wholly supported on the tank and which boviously, as the tank is swung, is adapted to change its position with respect to the pinion $7^b$ without interruption in the engagement of said wheel with said pinion. It is on account of the latter capability that the actuation of the mixing and kneading means can be continued during the tilting of the tank and thus coöperate in effecting the discharge of the batch.

A highly satisfactory arrangement for both tilting the tank from and for restoring it to its normal vertical position, comprises curved racks 13, 13, having end ears $13^a$, by which they are bolted externally to the tank-ends near the bottom, said racks being engaged by pinions $14^a$ secured on an extended longitudinal shaft 14 below the tank near one side thereof and revolubly mounted in boxes $14^b$ therefor on the standards $5^a$, at the appropriate side of the machine. Said shaft 14 is shown as projecting somewhat at the left-hand end of the machine, Figs. 1 and 2, where it has secured thereon a gear wheel $14^c$. Horizontally extending brackets, $15^a$, $15^a$, connected to the adjacent frame 5, present bearings in which is revolubly mounted a transverse shaft 15 having a worm $15^b$ secured on one projecting portion and engaged with the wheel $14^c$. A crank-wheel $15^c$, secured on the other projecting portion of the shaft 15, provides for the convenient rotation of the latter by hand.

The rotation of the crank-wheel $15^c$ in the correct direction will correspondingly revolve the shaft 15 and its worm and cause the latter to slowly turn the shaft 14 and its pinions $14^a$, said pinions through their engagement with the racks 13 effecting the tilting of the tank, as will be readily understood. The reverse rotation of the hand-wheel will swing the tank in the opposite direction. An advantage of employing the worm $15^b$ ensues from the fact that while said worm can freely turn the wheel $14^c$, all tendency of the latter to revolve by reason of any power that might otherwise be exerted by the gravital weight of the pivotally supported tank will be resisted by the worm, the thread of which will receive the thrust of the teeth of the wheel $14^c$ in a direction parallel with the worm axis. Therefore, the worm when at rest will positively hold said wheel and thereby retain the tank in any position it may be adjusted. Consequently, the movements of the tank are absolutely under manual control.

While the system of gearing previously described for actuating the mixing and kneading means will suitably accomplish its designed purpose, the machine will be further improved in some respects by the employment of a second system of gearing which is located at the opposite end of the tank and driven from the main shaft 8, said second system embracing counterparts of the essential features of the first mentioned system, the only difference being in the reversed relation necessitated by the change of location. The similarity of elements of the first and second systems has warranted the designation of the counterparts in the latter system, by reference characters corresponding with those applied to the like elements in the first system. The character and operation of the second system will therefore be readily understood. It is important, however, to point out that the presence of the additional system of gearing results in the mixing and kneading means being positively driven from both ends of the tank, thus dividing and distributing the driving power and also securing a nicely balanced action of the moving parts. Furthermore, the tendency of the gearing, bearings, and also the parts within the tank, to strain, will be minimized, this being particularly so with respect to said parts, as the power being imparted from opposite points will be uniformly transmitted throughout such parts. The peculiar action of the conveyer will also be promoted by the compound power effect referred to.

The conveyer disclosed need not be adhered to, as other means may be adopted for effecting the horizontal shifting of the material. For instance, a revoluble shaft carrying arms or projections may be employed, said arms or projections being so disposed as to accomplish the end in view. In fact, I do not desire to be understood as limiting myself to the particular construction or any of the arrangements of parts embodied in the machine as illustrated and described, but reserve the right to all modifications within the scope of my invention.

Having now described my invention, what I claim as new and desire to secure by Letters Patent, is—

1. In a machine of the character described, the combination with a tank, of mixing and kneading mechanism within the same, comprising means for horizontally shifting the material from the ends of the tank to an intermediate point, and differentially revolving kneading means, together with means for actuating said mechanism.

2. In a machine of the character described, the combination with a tank, of mixing mechanism within the same, comprising means for horizontally shifting the material from the ends of the tank to an intermediate point, and means for moving the shifted material about the shifting means to be further acted upon by the latter, together with means for actuating said mechanism.

3. In a machine of the character described, the combination with a tank, of mixing mechanism within the same, comprising means for horizontally shifting the material from the ends of the tank to an intermediate point, and means for moving the shifted material beneath and to the opposite side of the shifting means to be further acted upon by the latter, together with means for actuating said mechanism.

4. In a machine of the character described, the combination with a tank, of mixing and kneading mechanism within the same, comprising means for horizontally shifting the material from the ends of the tank to an intermediate point, and a device having a range of movement from one side of the shifting means to the other side thereof for further acting upon the material, together with means for actuating said mechanism.

5. In a machine of the character described, the combination with a tank, of mixing and kneading mechanism within the same, comprising means for horizontally shifting the material from the ends of the tank to an intermediate point, and a device revoluble in a path around said shifting means for further acting upon the material, together with means for actuating said mechanism.

6. In a machine of the character described, the combination with a tank, of mixing and kneading mechanism within the same, comprising means for horizontally shifting the material, and a device having a range of movement from one side of the shifting means to the other side thereof, said device being coactive with the tank for compressing the material, and means for actuating said mechanism.

7. In a machine of the character described, the combination with a tank, of oppositely revolving elements within said tank and each comprising a radially supported member, a portion of which is adapted to cross or overlap the path of movement of a portion of the member of the other element, means for horizontally shifting the material from the ends of the tank to an intermediate point to be acted upon by said oppositely revolving elements and means for actuating said elements.

8. In a machine of the character described, the combination with a tank, of a pair of oppositely revolving elements within said tank and each comprising a radially supported member, a portion of which is adapted to cross or overlap the path of movement of a portion of the member of the other element, both of said members being coactive with the tank for compressing the material, means for shifting the material from the ends of the tank to an intermediate point to be acted upon by the said elements and means for actuating said elements.

9. In a machine of the character described, the combination with a tank, of mixing and kneading mechanism within the same comprising means for horizontally shifting the material from the ends of the tank to an intermediate point, and means for kneading the material as it accumulates at said point.

10. In a machine of the character described the combination with a tank, of mixing and kneading mechanism within the same comprising revoluble means for horizontally shifting the material from the ends of the tank to an intermediate point, and rotary means for beating and kneading the material as it accumulates at said point.

11. In a machine of the character described, the combination with a tank, of a rotary conveyer horizontally supported therein, and constructed to shift the material from ends of the tank to an intermediate point, cross-heads movable with said conveyer and having rod-connections, a pair of arms revolubly supported within said tank and having a rod-connection, the latter adapted to cross or overlap the path of movement of the rod-connections of the cross-heads, the rod-connections of both the heads and the arms being coactive with the tank to compress the material, and means for oppositely driving said conveyer and arms.

12. In a machine of the character described, the combination with a tank, of a rotary conveyer horizontally supported therein, cross-heads movable with said conveyer and having rods located to move in different concentric paths, a pair of arms also supported within said tank and having rods located to move in different concentric paths and cross or overlap the paths of movement of the cross-head rods, the rods of both the heads and the arms being coactive with the tank to compress the material, and means for oppositely driving said conveyer and arms at relatively different speeds.

13. In a machine of the character described, the combination with a tank, of rotating elements within the same, one of said elements comprising a rotary horizontal conveyer embodying differential flights, and a radially supported member movable with said conveyer, and the other element including a radially supported member, a portion of which is adapted to cross or overlap the path of movement of the member of the other element, both of said elements being coactive with the tank to compress the material, and means for oppositely driving said rotary elements at relatively different speeds.

14. In a machine of the character described, the combination with a tank, of mixing mechanism within the same, comprising means for oppositely shifting the material in the direction of an intermediate point, and means for moving the shifted material to the opposite side of the shifting means to be further acted upon by the latter, and means for actuating said mechanism.

15. In a machine of the character described, the combination with a tank, of mixing mechanism within the same, comprising means for oppositely shifting the material in the direction of an intermediate point, and means for moving the shifted material beneath and to the opposite side of the shifting means to be further acted upon by the latter, together with means for actuating said mechanism.

16. In a machine of the character described, the combination with a tank, of mixing and kneading mechanism within the same, comprising means for oppositely shifting the material in the direction of an intermediate point, means for moving the shifted material to the opposite sides of the shifting means, and a device coactive with said moving means and with the tank for mixing and kneading the material, together with means for actuating said mechanism.

17. In a machine of the character described, the combination with a tank, of mixing and kneading mechanism within the same, comprising means for oppositely shifting the material in the direction of an intermediate point, a plurality of means for successively moving the shifted material to the opposite side of the shifting means, and a device coactive with each of said means and with the tank for mixing and kneading the material, together with means for actuating said mechanism.

18. In a machine of the character described, the combination with a tank, of longitudinally disposed mixing mechanism within said tank, comprising means for horizontally shifting material practically throughout the length of the tank, toward a point intermediate to the ends of the latter and means for moving the shifted material to opposite sides of the shifting means to be further acted upon by the latter, and means for actuating said mechanism.

19. In a machine of the character described, the combination with a tank, of mixing mechanism therein, including a horizontally disposed conveyer embodying continuous right and left-hand flights approximately extending from the tank-ends to and mutually merging at an intermediate point within said tank, said conveyer operating to move the material to a point intermediate the ends of the tank, means for kneading the dough while being conveyed, and means for rotating said conveyer independently of the casing.

Signed at New York in the county of New York and State of New York this 8th day of September A. D. 1905.

GEORGE J. HICKS.

Witnesses:
   CHAS. F. DANE,
   HERBERT E. DANE.